(12) United States Patent
Shi et al.

(10) Patent No.: US 12,514,540 B2
(45) Date of Patent: Jan. 6, 2026

(54) TISSUE RESECTION SYSTEM AND METHOD FOR DETERMINING CUTTING PARAMETER THEREOF, COMPUTER-READABLE STORAGE MEDIUM, AND ELECTRONIC DEVICE

(71) Applicant: HEALINNO (BEIJING) MEDICAL TECHNOLOGY CO., LTD., Beijing (CN)

(72) Inventors: Yilun Shi, Beijing (CN); Tao Ma, Beijing (CN); Jing Zhao, Beijing (CN); Wenbo Chen, Beijing (CN)

(73) Assignee: HEALINNO (BEIJING) MEDICAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/667,469

(22) Filed: May 17, 2024

(65) Prior Publication Data
US 2024/0299003 A1    Sep. 12, 2024

Related U.S. Application Data

(63) Continuation of application No. PCT/CN2022/132253, filed on Nov. 16, 2022.

(30) Foreign Application Priority Data

Nov. 18, 2021   (CN) .......................... 202111365431.4

(51) Int. Cl.
*A61B 8/08*    (2006.01)
*A61B 8/12*    (2006.01)
(Continued)

(52) U.S. Cl.
CPC ................ *A61B 8/085* (2013.01); *A61B 8/12* (2013.01); *A61B 17/3203* (2013.01); *A61B 2017/00274* (2013.01)

(58) Field of Classification Search
CPC ....... A61B 8/085; A61B 8/12; A61B 17/3203; A61B 2017/00274; A61B 8/14; A61B 18/12; A61B 2018/00636
See application file for complete search history.

(56) References Cited

U.S. PATENT DOCUMENTS

| 11,259,870 | B2 * | 3/2022 | DiMaio ................... A61B 34/71 |
| 2002/0010502 | A1 * | 1/2002 | Trachtenberg .......... A61F 7/123 606/113 |

(Continued)

FOREIGN PATENT DOCUMENTS

| CN | 104203078 A | 12/2014 |
| CN | 110164557 A | 8/2019 |
| CN | 113409333 A | 9/2021 |

*Primary Examiner* — Adil Partap S Virk

(57) ABSTRACT

A tissue resection system and a method for determining a cutting parameter, the method comprising the following steps: acquiring a three-dimensional ultrasonic image of a target tissue; slicing the three-dimensional ultrasonic image to form a series of two-dimensional slice images, according to a preset step size; determining contour information the two-dimensional slice images; and calculating a cutting parameter on the basis of the determined contour information comprising contour information of an ablation tool and contour information of the target tissue, the cutting parameter comprising at least one of: a cutting position parameter (L), a cutting depth parameter (R), and a cutting angle parameter (β). Therefore, a cutting parameter can be calculated more efficiently, and a more reasonable and larger cutting range can be planned more precisely, thus resection efficiency, the resection area, and safety are all achieved.

7 Claims, 13 Drawing Sheets

(51) Int. Cl.
*A61B 17/00* (2006.01)
*A61B 17/3203* (2006.01)

(56) References Cited

U.S. PATENT DOCUMENTS

| | | | | |
|---|---|---|---|---|
| 2003/0073908 A1* | 4/2003 | Desai | ............... | A61B 17/3478 600/464 |
| 2003/0178032 A1* | 9/2003 | Ingle | ............... | A61B 18/1485 606/41 |
| 2003/0229282 A1* | 12/2003 | Burdette | ............ | A61N 5/1007 600/7 |
| 2006/0089636 A1* | 4/2006 | Christopherson | .. | A61B 18/1485 606/41 |
| 2009/0118724 A1* | 5/2009 | Zvuloni | ............... | A61N 7/02 601/2 |
| 2009/0136108 A1* | 5/2009 | Badiei | ............... | G06T 7/149 382/131 |
| 2010/0172559 A1* | 7/2010 | Kumar | ............... | A61B 34/20 382/154 |
| 2012/0027278 A1* | 2/2012 | Chaney | ............... | G06T 7/344 382/131 |
| 2015/0087975 A1* | 3/2015 | Salcudean | ........... | A61B 8/0858 606/20 |
| 2016/0008074 A1* | 1/2016 | Glossop | ................ | A61B 90/11 606/130 |
| 2016/0338679 A1* | 11/2016 | Tehrani | ............... | A61B 5/061 |
| 2017/0020558 A1* | 1/2017 | Xu | ........................ | A61B 8/483 |
| 2017/0043180 A1* | 2/2017 | Amthor | ................. | A61N 5/103 |
| 2018/0280089 A1* | 10/2018 | Elevelt | ................. | A61N 1/403 |
| 2019/0261944 A1* | 8/2019 | Stapert | ................. | A61B 8/463 |
| 2020/0023207 A1* | 1/2020 | Carol | ..................... | C12N 5/068 |
| 2021/0121251 A1* | 4/2021 | Aljuri | ................. | G06N 3/0464 |
| 2021/0353261 A1* | 11/2021 | Ebata | ..................... | A61B 8/085 |
| 2022/0133284 A1* | 5/2022 | Lampotang | ........ | A61B 10/0241 600/562 |
| 2024/0299003 A1* | 9/2024 | Shi | ............................. | A61B 8/12 |
| 2024/0335235 A1* | 10/2024 | Kee | ............................ | A61B 17/3403 |

* cited by examiner

TISSUE RESECTION SYSTEM AND METHOD FOR DETERMINING CUTTING PARAMETER THEREOF, COMPUTER-READABLE STORAGE MEDIUM, AND ELECTRONIC DEVICE

CROSS-REFERENCE TO RELATED APPLICATIONS

The application claims priority to Chinese patent application No. 202111365431.4, filed on Nov. 18, 2021, the entire contents of which are incorporated herein by reference.

TECHNICAL FIELD

The present invention relates to the field of medical devices, and in particular, to a tissue resection system and a method for determining a cutting parameter thereof.

BACKGROUND

Benign prostatic hyperplasia (BPH), also referred to as prostatic hypertrophy, is a common disease of middle-aged and elderly men, with a hyperplastic gland located at a bladder neck, which obstructs a urinary tract, causes frequent urination and dysuria, and seriously affects the quality of life of patients. The BPH is also referred to as benign prostatic hypertrophy. It ranks second only to urolithiasis in inpatients in the urology department. For the treatment of hyperplastic or cancerous tissues, in addition to drug therapy, conventional surgical resection or partial resection surgery is commonly used for a very long time. This method generally relies on open incisions, and has disadvantages such as strong invasiveness, large trauma, and a long recovery period. Post-minimally invasive resection therapy is widely used in this field. For example, energy such as various types of lasers, water jets, two-stage electrotomes, and single-stage electrotomes is used to resect and/or burn a lesion tissue or benign prostatic hyperplasia tissue as a fluid flow, which generally enters through a urethra without the need for an open incision, and has the advantage of minimal trauma.

It is important how to determine a cutting parameter when energy is used for tissue resection against benign prostatic hyperplasia. The determining of the cutting parameter not only affects efficiency of surgery, but also affects the safety and reliability of surgery.

With the prior art in which water jet resection is performed on a benign prostatic hyperplasia tissue as an example, when performing surgery, a doctor needs to obtain an ultrasonic image by a rectal ultrasound probe. The doctor performs manual marking by reading a two-dimensional rectal ultrasonic image, or manually inputs a parameter, and information input by the doctor needs to be converted into a cutting parameter for cutting path planning during the surgery. Moreover, it is necessary to set control ranges of water jet movement according to the doctor's experience, and manually set different parameters such as a rotation angle and a water jet pressure in each control range. For the avoidance of sensitive or key parts (such as the bladder neck and seminal colliculus), position selection of the cutting parameter and the determining of a cutting range need to rely on manual marking by the doctor. This method has obvious disadvantages. Due to dependence on the participation of the doctor, on the one hand, there are a lot of uncertainties in the determining of the cutting parameter in view of the objective impact of image quality and manual operation errors. When the doctor has less experience, it is difficult to carry out a scheme, or it is difficult to obtain a desired resection effect, or an undesired surgical accident is caused. On the other hand, manual indexing increases the workload of medical staff, and complicated operations make the surgical process long, making a patient's surgical experience worse and making the patient psychologically more rejective or even more repulsive to such surgery, resulting in delayed therapy.

SUMMARY

An objective of the present invention is to provide a tissue resection system and a method for determining a cutting parameter thereof, to quickly determine an optimal cutting parameter of an ablation tool in the tissue resection system without relying on excessive manual participation, cause the ablation tool to perform tissue resection according to the determined cutting parameter, calculate the cutting parameter more efficiently, and plan a more reasonable and larger cutting range more precisely, thereby taking resection efficiency, a resection area, and safety into account.

To achieve the above invention objective, the present invention uses the following technical solution.

The present invention provides a method for determining a cutting parameter of a tissue resection system, comprising the following steps:
  acquiring ultrasonic image information of a target tissue;
  obtaining a plurality of two-dimensional slice images from the ultrasonic image information according to a preset step size, wherein each of the plurality of two-dimensional slice images is a cross-sectional image perpendicular to an axial direction of an ultrasonic probe;
  determining target tissue contour information and ablation tool contour information in each of the plurality of two-dimensional slice images; and
  determining a cutting parameter on the basis of the determined target tissue contour information and ablation tool contour information, the cutting parameter comprising at least one of a cutting position parameter (L), a cutting depth parameter (R), and a cutting angle parameter ($\beta$).

According to the present invention, a resection range in each of the plurality of two-dimensional slice images can be determined based on the target tissue contour information and the ablation tool contour information, thereby taking the resection efficiency, the resection area and safety into account.

Preferably, the step of determining a cutting parameter further comprises: acquiring a fitted circle center of an ablation tool contour as a detected circle center; and determining, with the detected circle center as a circle center, the cutting depth parameter (R) and the cutting angle parameter ($\beta$) by means of a sector fitting method or a rotation radius method, so as to obtain an optimal resection area within a safety range. According to the present invention, the resection range can be simply determined based on the fitted circle center of the ablation tool contour and the target tissue contour information.

Preferably, the step of determining a cutting parameter further comprises: acquiring a fitted circle center of an ablation tool contour, determining the cutting depth parameter (R) based on a minimum value of a distance between the circle center and each intersection point on a target tissue contour within a preset angle range, and determining the cutting angle parameter ($\beta$) based on an intersection point of an arc with the fitted circle center of the ablation tool contour as a circle center and the cutting depth parameter (R) as a radius. According to the present invention, the resection range can be simply determined based on the fitted circle center of the ablation tool contour and the target tissue contour information.

Preferably, for each of the plurality of two-dimensional slice images, a plurality of groups of candidate resection areas are calculated by changing a cutting depth and/or a cutting angle, a maximum area in the plurality of groups of candidate resection areas is selected as an optimal resection area, and a cutting depth and a cutting angle corresponding to the maximum resection area are taken as the cutting depth parameter (R) and the cutting angle parameter (β).

According to the present invention, the optimal resection area can be determined to the maximum extent by a simple method.

Preferably, for adjacent two-dimensional slice images in the plurality of two-dimensional slice images, the cutting depth parameter (R) and the cutting angle parameter (β) of each of the adjacent two-dimensional slice images are determined in such a manner that a ratio of an overlapping area of projections of respective resection areas of the adjacent two-dimensional slice images in an axial direction of the ultrasonic probe to each of the respective resection areas is a specified threshold or above.

According to the present invention, excessive jump of the resection range between adjacent two-dimensional slice images can be avoided, and the resection range can be prevented from becoming discontinuous in an axial direction of the target tissue (advancing/retreating direction of the ablation tool).

Preferably, the target tissue is a benign prostatic hyperplasia tissue, the ablation tool is a fluid ablation tool, and the three-dimensional ultrasonic image is obtained by a rectal ultrasound probe.

Preferably, a safety factor is further set, and the cutting parameter is determined based on the safety factor.

The present invention can alternatively be implemented as a tissue resection system for resecting a target tissue, which comprises:
- a motion control module, wherein the motion control module comprises a fixed reference component, and a first motion control component and a second motion control component that are connected to the fixed reference component;
- an ablation tool module, wherein the ablation tool module comprises an ablation tool, and the ablation tool is connected to the first motion control component;
- an ultrasonic imaging module, wherein the ultrasonic imaging module comprises a longitudinal ultrasonic probe for acquiring ultrasonic image information of a target tissue, and the ultrasonic probe is connected to the second motion control component; and
- a processor, wherein the processor is configured to obtain a plurality of two-dimensional slice images from the ultrasonic image information according to a preset step size, each of the plurality of two-dimensional slice images being a cross-sectional image perpendicular to an axial direction of the ultrasonic probe, and determine target tissue contour information and ablation tool contour information in each of the plurality of two-dimensional slice images; and determine a cutting parameter on the basis of the determined target tissue contour information and ablation tool contour information, the cutting parameter comprising at least one of a cutting position parameter (L), a cutting depth parameter (R), and a cutting angle parameter (β).

Preferably, the ablation tool module performs cutting based on the cutting parameter calculated by the processor.

Preferably, the ablation tool is in the shape of a slender shaft, with an end provided with an energy exit port, and is configured to guide energy to a to-be-resected target tissue through the energy exit port, so as to ablate and resect the target tissue.

Preferably, the target tissue is a benign prostatic hyperplasia tissue, the ablation tool is a water jet, and the ultrasonic probe is a rectal ultrasonic probe.

Preferably, the processor is further configured to obtain a fitted circle center of an ablation tool contour as a detected circle center; and determine, with the detected circle center as a circle center, the cutting depth parameter (R) and the cutting angle parameter (β) by means of a sector fitting method or a rotation radius method, so as to obtain an optimal resection area within a safety range.

Preferably, the processor is further configured to acquire a fitted circle center of an ablation tool contour, determine the cutting depth parameter (R) based on a minimum value of a distance between the circle center and each intersection point on a target tissue contour within a preset angle range, and determine the cutting angle parameter (β) based on an intersection point of an arc with the fitted circle center of the ablation tool contour as a circle center and the cutting depth parameter (R) as a radius.

Preferably, for each of the plurality of two-dimensional slice images, a plurality of groups of candidate resection areas are calculated by changing a cutting depth and/or a cutting angle, a maximum area in the plurality of groups of candidate resection areas is selected as an optimal resection area, and a cutting depth and a cutting angle corresponding to the maximum resection area are taken as the cutting depth parameter (R) and the cutting angle parameter (β).

Preferably, for adjacent two-dimensional slice images in the plurality of two-dimensional slice images, the cutting depth parameter (R) and the cutting angle parameter (β) of each of the adjacent two-dimensional slice images are determined in such a manner that a ratio of an overlapping area of projections of respective resection areas of the adjacent two-dimensional slice images in an axial direction of the ultrasonic probe to each of the respective resection areas is a specified threshold or above.

The present invention can be further implemented as a computer-readable storage medium storing a computer program thereon, characterized in that, the program, when executed by a processor, implements the method described above.

The present invention can be further implemented as an electronic device, comprising a memory, a processor, and a computer program that is stored in the memory and can be run in the processor, characterized in that, the processor implements the method described above when executing the computer program.

The present invention has the following beneficial effects: On the one hand, according to the technical solution of the present invention, a cutting parameter of a tissue resection tool can be quickly obtained by processing and calculating image contour information and position information, thereby reducing the complexity of manual marking and enabling the tissue resection system to quickly determine the cutting parameter. On the other hand, according to the technical solution of the present invention, the cutting parameter of the tissue ablation tool in a plane where the two-dimensional slice image is located can be determined for each two-dimensional slice image, thereby providing a basis and possibility for more accurate determining of the cutting parameter and motion control of the tissue ablation tool. Furthermore, by means of the technical solution of the present invention, a resection area can be ensured to be maximized on each two-dimensional slice image, so as to ensure the resection of the maximum area within a safety range.

The technical solution of the present invention is particularly suitable for resection of benign prostatic hyperplasia. When the technical solution is suitable for BPH resection surgery, according to the technical solution of the present invention, a cutting contour, and sensitive positions to be avoided during cutting, such as the position of seminal colliculus, can be quickly and accurately marked, and a cutting starting position and a cutting ending position can be marked, which makes it possible to implement the planning and execution by a robot, and the problems of excessive manual participation, large errors, low accuracy, long surgical process, poor safety, and the like in the prior art can be effectively solved, thereby greatly improving surgical safety, reliability and safety.

BRIEF DESCRIPTION OF DRAWINGS

The accompanying drawings described herein are intended to provide a further understanding of the present invention, and constitute a part of the present invention. The schematic embodiments of the present invention and descriptions thereof are intended to explain the present invention and do not constitute an inappropriate limitation to the present invention. In the drawings.

DETAILED DESCRIPTION OF THE EMBODIMENTS

Figure 1:
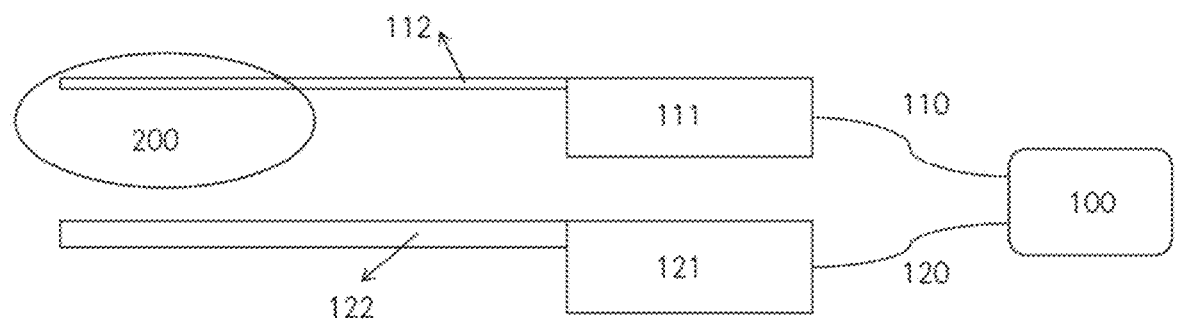
FIG. 1 is a schematic diagram of a main structure of a tissue resection system and a connection relationship thereof according to an embodiment of the present invention.

To make the objective, technical solutions and advantages of the present invention clearer, the technical solutions of the present invention are clearly and completely described below with reference to the specific embodiments of the present invention and corresponding accompanying drawings. Clearly, the embodiments described are merely some rather than all of the embodiments of the present invention. Although many technical details are described in detail in the specific embodiments of the present invention, it should be understood that these details do not limit the scope of protection of the present invention. Any improvements or changes made by those of ordinary skill in the art on the basis of the technical solutions disclosed in the present invention without any creative efforts are also within the scope of protection of the present invention.

It should be noted that although in the present invention, the resection system and a scheme for determining a cutting parameter are described based on the resection of a benign prostatic hyperplasia tissue, those skilled in the art can make adaptive adjustments to the method and system according to the present invention based on differences of target tissues under the basic method, purpose and spirit of the present invention. This can also be used to treat any other similar human tissues and organs, such as kidneys, liver, skin, muscles, glands, esophagus, throat, and intestine, and also falls within the scope of protection of the present invention.

In the terms used in the present invention, "target tissue" refers to a human tissue or focus tissue to be resected, and "target tissue working area" refers to an area where an ablation tool is inserted and performs a cutting action in order to resect a target tissue or a focus tissue. The term "ablation tool" refers to a tool that cuts and burns a tissue by means of energy (such as water jets, lasers, and electricity), so that the target tissue or focus tissue is ablated or resected (usually manifested as a decrease in volume). The term "cutting angle" refers to an angle by which the energy used for ablating a tissue rotates and sweeps after exiting from the energy exit port. The terms "cutting depth" and "cutting radius" refer to a farthest distance that the energy for ablating a tissue can reach after exiting from the energy exit port, which is embodied as a sector radius during planning. In water jet surgery, this parameter is related to a water jet pressure. The term "cutting position" refers to a position where the energy exit port of a tissue ablation apparatus is located when moving in an axial direction during the surgery. The term "cutting contour" refers to an outer contour line of an overall shape of cutting path planning formed at a cutting position according to a determined cutting depth parameter and cutting angle parameter. The part within the contour line becomes a "cutting range" while the area within the cutting range is referred to as a "cutting area".

Unless otherwise specified in the present invention, the term "proximal end" or "rear end" refers to an end of a surgical or imaging apparatus that is relatively closer to an operator and farther away from the target tissue, while the "distal end", "front end" and "tail end" refer to an end of the surgical or imaging apparatus that is relatively farther away from the operator and closer to the target tissue.

The technical solution provided by each embodiment of the present invention is described in detail below with reference to the accompanying drawings.

As shown in FIG. 1, a tissue resection system for resecting a target tissue according to the present invention is a medical water jet robot system for treating benign prostatic hyperplasia. The system comprises a motion control module, an ablation tool module, a three-dimensional ultrasonic imaging module, and a processor. The motion control module comprises a fixed base 100 as a fixed reference component, and a first motion control component and a second motion control component that are connected to the fixed base 100. The first motion control component may be a first mechanical arm 110, and the second motion control component may be a second mechanical arm 120. The first mechanical arm 110 and the second mechanical arm 120 are in rotation-fit connection with the fixed base 100. Ends of the first mechanical arm 110 and the second mechanical arm 120 are each provided with an encoder, or other similar position feedback apparatuses or positioning apparatuses that can be used to transmit position information of the first mechanical arm and the second mechanical arm. The first mechanical arm 110 and/or second mechanical arm 120 may be the same or different, and those skilled in the art can select as required. For example, 6-axis or 7-axis mechanical arms may be selected, both may be active mechanical arms or passive mechanical arms, or one is an active mechanical arm and the other is a passive mechanical arm. In addition, in some embodiments, the first mechanical arm 110 and/or the second mechanical arm 120 may be replaced by a rotatable support.

The fixed base 100 is mainly used as a fixed reference, and a structure thereof is not limited. A coordinate system where the fixed base 100 is located is used as a standard coordinate system. The fixed base 100 is internally or externally connected and provided with one or more processors (CPUs). A preset algorithm corresponding program is stored in the processor, so that the processor can obtain data from the ablation tool module, the motion control module and the three-dimensional ultrasonic imaging module, calculate and process the obtained data, and send the calculated data to a control module or a display module.

The ablation tool module comprises an ablation tool, an endoscope, and a sheath. The ablation tool and the endoscopic apparatus are integrated in the sheath 112. The ablation tool is in the shape of a slender shaft, with a tail end provided with an energy exit port (not shown in the figure). Through the energy exit port, energy for resecting the target tissue may be transferred to the target tissue working area, and the target tissue is cut by means of the energy. An energy source for resecting a tissue may be water jet, laser or electric energy. In the medical water jet robot system for treating benign prostatic hyperplasia, the energy used by ablation tool is water jet, and the water jet with a certain pressure is output to the target tissue, so that the target tissue can be broken or removed. Rear ends of the ablation tool and the endoscopic apparatus extend out from the sheath 112 to be inserted and fitted with a first adapter 111 fixedly arranged at a front end of the first mechanical arm 110, so that the first mechanical arm 110 can drive the calibrated ablation tool to move forward or backward in an axial direction of the slender shaft, and can drive the ablation tool to rotate around a central axis of the slender shaft as a rotation axis, so that the energy exit port rotates and swings in an exit direction. The sheath 112 is in the shape of a slender tube, and the sheath 112 is inserted into a prostate 200 along a urethra during resection of the benign prostatic hyperplasia tissue.

The three-dimensional ultrasonic imaging module comprises an ultrasonic probe 122, and the ultrasonic probe 122 is in the shape of a slender tube. A rear end of the ultrasonic probe is inserted and fitted with a second adapter 121 fixedly provided at a front end of a second mechanical arm 120, and the second mechanical arm 120 and the second adapter 121 can drive the ultrasonic probe 122 to move forward or backward in an axial direction of the slender tube and rotate around an axis of the slender tube as a rotation axis. The second mechanical arm 120 drives the image position-calibrated ultrasonic probe 122 to move forward at a predetermined speed. The slender tubular ultrasonic probe 122 is inserted into the human body along a rectal passage of a patient. During the insertion, the ultrasonic probe 122 sequentially collects ultrasound sagittal plane images and ultrasonic transverse plane images. A three-dimensional ultrasonic image can be reconstructed according to an acquired ultrasound transverse plane image sequence. The three-dimensional ultrasonic image may also be obtained by other methods.

According to one of solutions of this embodiment, the ultrasonic probe 122 is a rectal biplane ultrasonic probe, and image calibration is performed on the ultrasonic probe in advance. The ablation tool is a water jet (that is, an ablation tool that provides water jet with an enough pressure to break the target tissue), and the position of the water jet is calibrated in advance. The purpose of the above calibration is to unify a coordinate system for images collected by the ultrasonic probe and the water jet, which can be achieved by using calibration techniques such as arranging a position sensor as known in the art.

The obtained three-dimensional ultrasonic image is sliced according to a predetermined step size to obtain a plurality of two-dimensional ultrasound slice images, and the processor calculates a cutting parameter for each two-dimensional ultrasound slice image. The cutting parameter comprises at least one of a cutting position parameter L, a cutting depth parameter R, and a cutting angle parameter $\beta$. After the cutting parameter is determined, the processor sends cutting parameter information to the motion control module and the ablation tool module, so that the ablation tool module performs cutting based on the determined cutting parameter.

Figure 2:
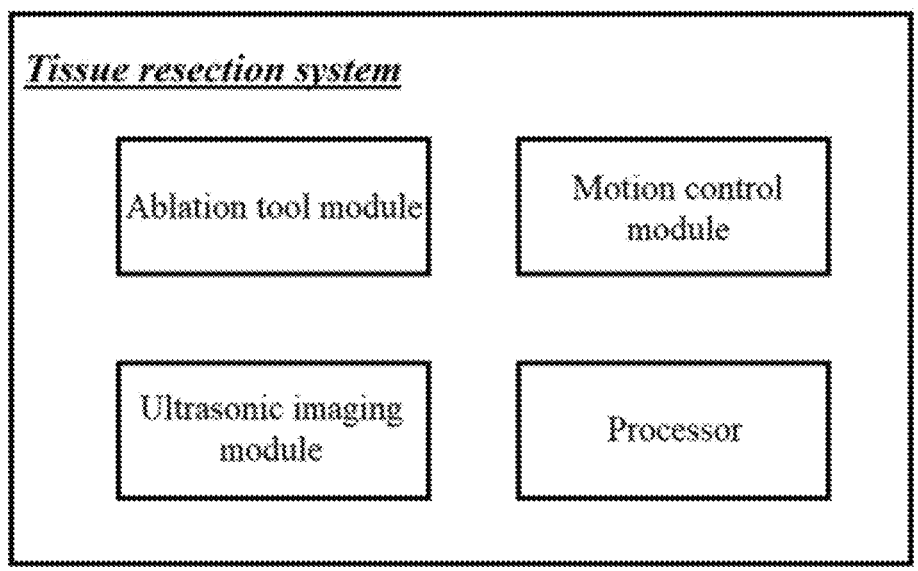
FIG. 2 is a schematic diagram of main modules of a tissue resection system according to an embodiment of the present invention.

FIG. 2 shows constituent modules of a tissue resection system according to an embodiment of the present invention. The tissue resection system comprises an ablation tool module, an ultrasonic imaging module, a motion control module, and a processor. The processor is configured to acquire relevant signals and data, determine a cutting parameter by a calculation method according to the present invention, and send the determined cutting parameter to the motion control module and the ablation tool module, such that the ablation tool module performs cutting according to the determined cutting parameter.

Figure 3:
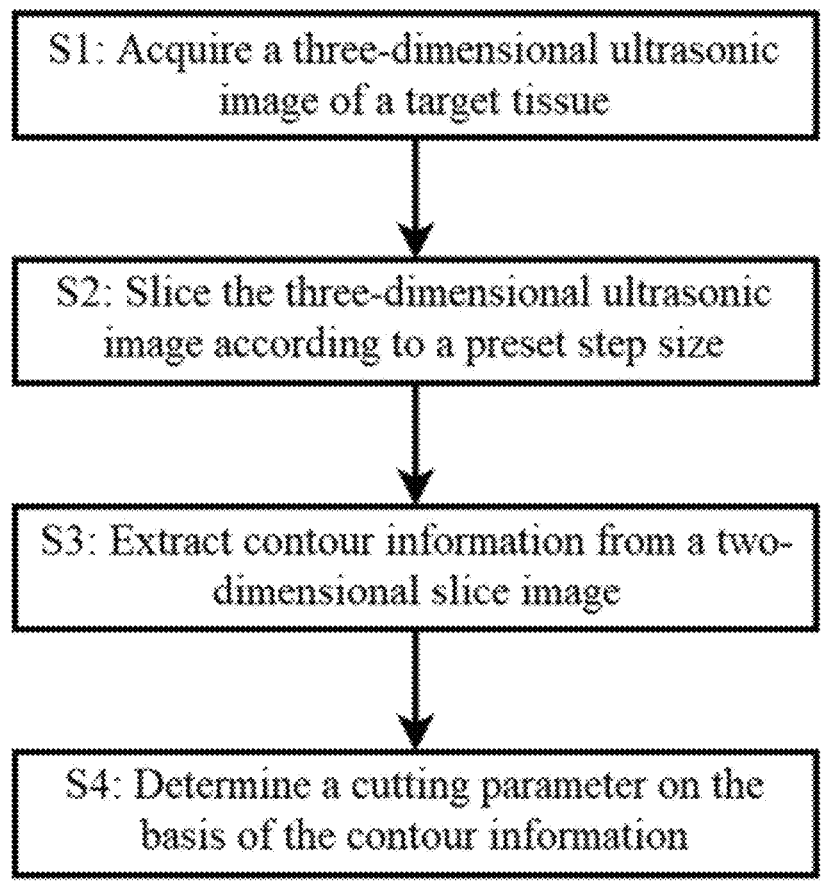
FIG. 3 is a schematic flowchart of a method for determining a cutting parameter of a tissue resection system according to an embodiment of the present invention.

FIG. 3 is a basic schematic flowchart of a method for determining a cutting parameter of a tissue resection system according to an embodiment of the present invention. As shown in the figure, the basic process comprises the following steps.

Step S1: Acquire a three-dimensional ultrasonic image of a target tissue (for example, prostate) by means of an ultrasonic probe.

Step S2: Slice the three-dimensional ultrasonic image to form a series of two-dimensional slice images, and preferably, perform slicing in an axial direction of the ultrasonic probe according to a preset step size.

In addition, it should be noted that when the ultrasonic probe 122 acquires an ultrasound sagittal plane image, a three-dimensional ultrasonic image is reconstructed by means of steps S1 and S2 described above, and then the three-dimensional ultrasonic image is sliced, so that a slice image sequence of the transverse plane (the section perpendicular to the axial direction of the ultrasonic probe) of the target tissue can be obtained. On the other hand, when the ultrasonic probe 122 collects ultrasound transverse plane images, since the ultrasound transverse plane images themselves are a transverse plane slice image sequence of the target tissue, when a transverse plane slice collected by the ultrasonic probe 122 happens to be the transverse plane of tissue resection, two-dimensional transverse plane slice images collected by the ultrasonic probe 122 can be directly used, without slicing the three-dimensional ultrasonic image to obtain a transverse plane slice image sequence of the target tissue. However, when the transverse plane slice collected by the ultrasonic probe 122 is inconsistent with the transverse plane slice of tissue resection, it is still necessary to reconstruct the three-dimensional ultrasonic image by means of steps S1 and S2 described above, and then the three-dimensional ultrasonic image is sliced. For example, when the transverse plane of tissue resection is located between two transverse plane slices collected by the ultrasonic probe 122, it is necessary to slice the reconstructed three-dimensional ultrasonic image. In this case, the transverse plane image of tissue resection obtained by slicing is obtained by interpolation.

Step S3: Determine contour information for at least some of the series of two-dimensional slice images, wherein the determined contour information comprises contour information of an ablation tool and contour information of the target tissue.

Step S4: Calculate a cutting parameter based on the determined contour information.

In step S1, the three-dimensional ultrasonic image of the target tissue may be obtained in any manner in the prior art. Commonly, for example, three-dimensional reconstruction is performed by obtaining a plurality of transverse plane images of the target tissue, and the three-dimensional ultrasonic image of the target tissue is obtained by the three-dimensional reconstruction.

In step S2, the three-dimensional ultrasonic image is sliced in the axial direction according to a preset step size, and one or more two-dimensional slice images may be obtained through slicing.

An axial position where the one or more two-dimensional slices are located is a cutting position, and a cutting position parameter L may be expressed as L1, L2, L3, . . . .

In step S3, for the two-dimensional slice corresponding to the selected cutting position parameters (L1, L2, L3, . . . ), contour information C1 of the ablation tool and contour information C2 of the target tissue in the two-dimensional slice image are determined.

In step S4, a cutting angle parameter $\beta$ and a cutting depth parameter R corresponding to the two-dimensional slice are calculated according to the contour information C1 of the ablation tool and the contour information C2 of the target tissue that are determined in step S3.

After the completion of step S4, a series of cutting parameters can be obtained. For example,
- at the position L1, a cutting angle parameter $\beta1$ and a cutting depth parameter R1 may be obtained through calculation;
- at the position L2, a cutting angle parameter $\beta2$ and a cutting depth parameter R2 may be obtained through calculation;
- at the position L3, a cutting angle parameter $\beta3$ and a cutting depth parameter R3 may be obtained through calculation;

The processor sends a series of cutting parameters calculated and determined in step S4 to a control unit, to drive the ablation tool to move so that when an energy exit port of the ablation tool is at a corresponding cutting position Ln, cutting is performed according to a cutting angle $\beta n$ and a cutting depth Rn corresponding to the cutting position.

Figure 4:
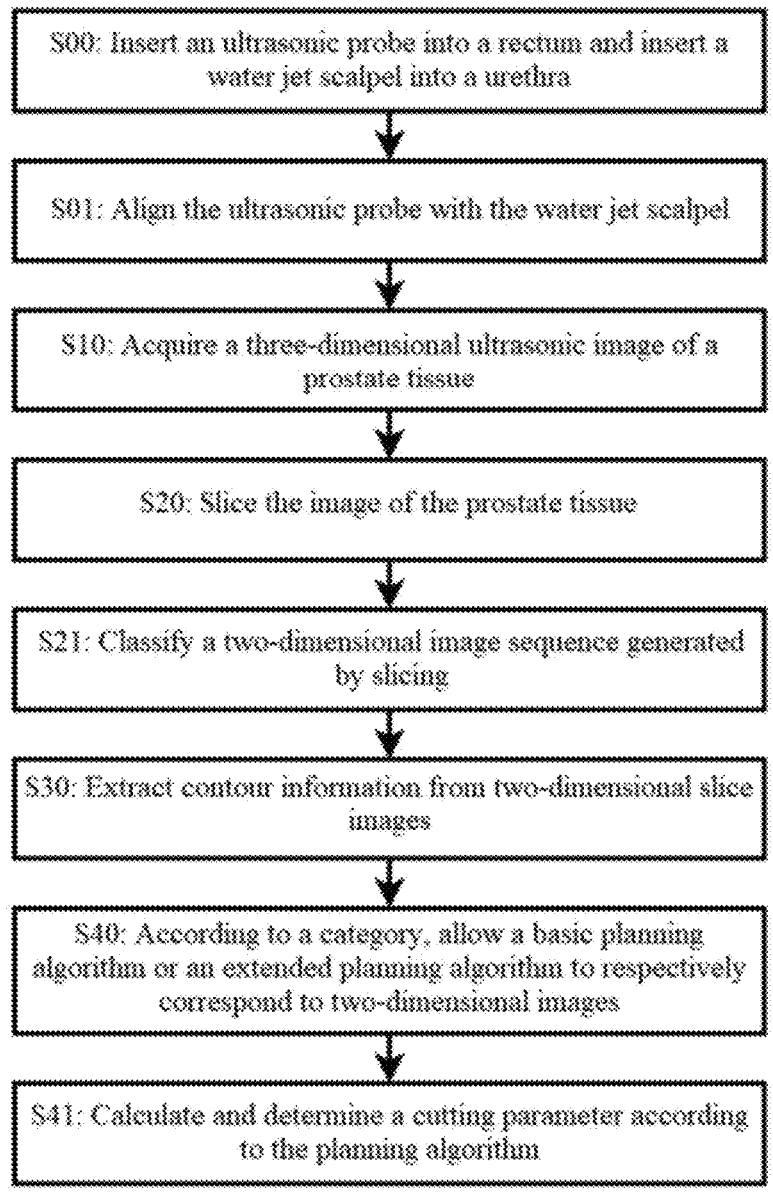
FIG. 4 is a schematic flowchart of a method for determining a cutting parameter of a benign prostatic hyperplasia tissue resection system according to an embodiment of the present invention.

FIG. 4 is a schematic flowchart of a method for determining a cutting parameter of a medical water jet robot system for treating benign prostatic hyperplasia according to an embodiment of the present invention.

When a tissue resection device is used for benign prostatic hyperplasia resection surgery, a water jet scalpel is selected as the ablation tool, and the ultrasonic probe is a rectal ultrasonic probe.

Step S00 is an initialization stage of the system, and at this stage, it is necessary to insert the image-calibrated ultrasonic probe into the rectum and insert the calibrated water jet scalpel into the urethra; and the above movements of the ultrasonic probe and the water jet scalpel can be controlled by a first mechanical arm 110 and a second mechanical arm 120.

In step S01, the ultrasonic probe and the water jet scalpel are aligned with each other, directions in which they are inserted into the patient's body cavity are approximately parallel, the direction of the ultrasonic probe should ensure that the image of the prostate tissue is within the visual field range of the ultrasonic probe, and the direction of the water jet scalpel should ensure that the direction of the energy exit port is approximately vertical downward.

In step S10, a three-dimensional ultrasonic image of the prostate tissue is acquired by using the ultrasonic probe, and the ultrasonic probe is a rectal biplane ultrasonic probe as an optional solution. For example, a convex array probe with a certain radius of curvature is arranged at a front end of the probe, and is configured to acquire a transverse plane image sequence, and a linear array probe is arranged on an axial side surface of the probe, and is configured to acquire a sagittal plane image sequence. According to the transverse plane image sequence obtained by the ultrasonic probe, the three-dimensional ultrasonic image of the target prostate tissue can be reconstructed.

In step S20, the three-dimensional ultrasonic image of the prostate tissue is sliced to obtain a series of two-dimensional slice images, and optionally, in step S21, the obtained series of two-dimensional slice images are classified. Classification criteria may be a volume of the target tissue, a position of a working area, other anatomical characteristics of the target tissue, etc.

In step S30, contour information in each two-dimensional slice image is determined, the contour information comprising contour information of the ablation tool and contour information of the target tissue, wherein the contour information of the target tissue may be obtained based on contour extraction from the two-dimensional slice image, and the contour information of the ablation tool may be obtained through the alignment and matching of a predetermined reference structure image and a target tissue image.

In step S40, according to a classification category determined in step S21, two-dimensional slice images respectively correspond to different planning algorithms, and a basic planning algorithm is executed for two-dimensional slice images away from sensitive parts while an extended planning algorithm is executed for two-dimensional slice images close to the sensitive parts.

In step S41, according to the planning algorithm determined in step S40, a cutting parameter of the two-dimensional slice image is calculated and determined. The cutting parameter may be a cutting angle and a cutting depth. For example, at a cutting position L1, the determined cutting parameter is $\beta1$ and R1. The cutting parameter may alternatively be a combination of different cutting angles and cutting depths. For example, at the cutting position L1, the determined cutting parameter is a combination of $\beta11$-R11, $\beta12$-R12, . . . .

After step S41, the ablation tool, that is, the water jet scalpel, can perform cutting according to the cutting parameter determined in step S41. When the cutting parameter is (L1, β1, R1), it means that at the cutting position L1, the water jet scalpel has a cutting angle of β1 and a cutting radius of R1, the cutting range of the water jet scalpel is a sector defined by the cutting angle β1 and the cutting radius R1 with an axis of the water jet scalpel as a circle center, and a resection area of the water jet scalpel is roughly equivalent to an area of the sector. When the cutting parameter is (L1, β11-R11, β12-R12), it means that at the cutting position L1, the cutting range of the water jet scalpel includes two parts: a first sector area defined by the angle range β11 and the radius range R11 with the axis of the water jet scalpel as a circle center, and a second sector area defined by the angle range β12 and the radius range R12 with the axis of the water jet scalpel as a circle center. In this case, a resection area of the water jet scalpel at the position L1 is roughly equivalent to the sum of areas of the first sector area and the second sector area.

Steps of determining a cutting depth parameter and a cutting angle parameter of the water jet scalpel are described in detail below.

Figure 8:
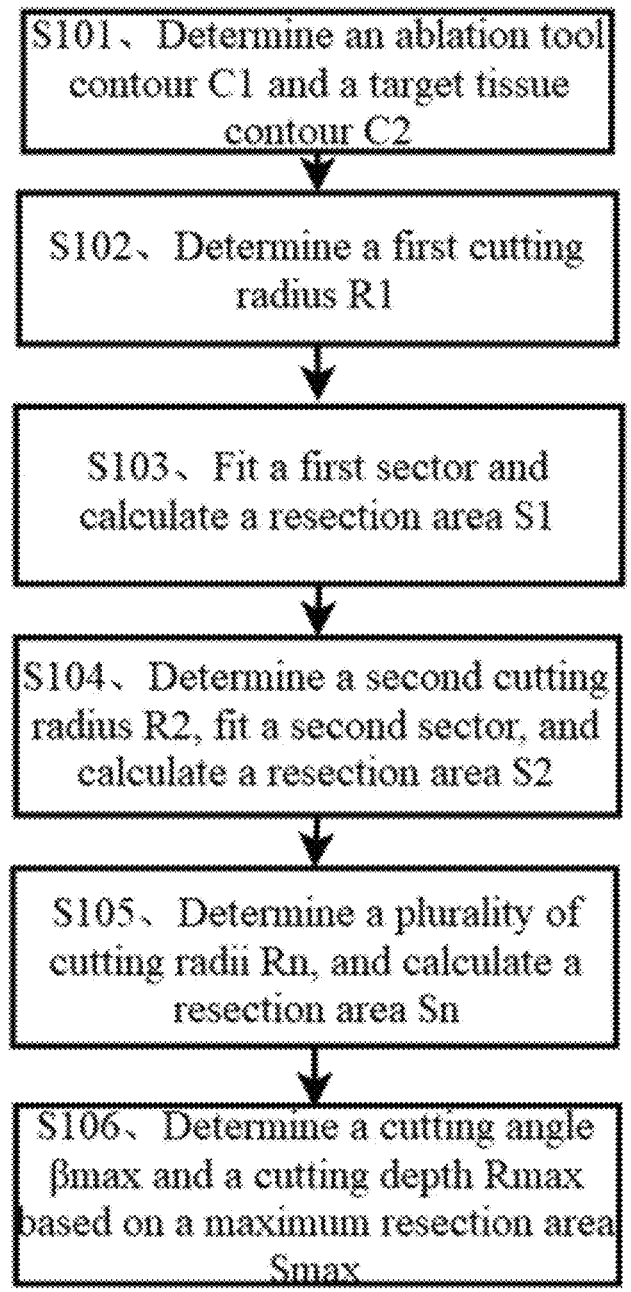
FIG. 8 is a flowchart of a method for determining a cutting parameter according to an embodiment of the present invention.

As shown in FIGS. 5-1 to 5-4, a principle of determining a cutting parameter by a sector fitting method is described, and main steps of this method are shown in FIG. 8.

In a reference coordinate system, C2 is an outer contour of an extracted target tissue, and C1 is an outer contour of an ablation tool. In benign prostatic hyperplasia resection surgery, C2 is roughly oval in shape, but is irregular on the whole, and various bends may be seen at an edge of the contour. C1 is roughly round or oval in shape, and its circle center O may be obtained by fitting. The circle center O is usually located above the center of the contour of the target tissue.

In step S101, the contour information C1 of the ablation tool in the two-dimensional slice image is determined, and a fitted circle center of the contour C1 of the ablation tool in the two-dimensional slice image is obtained as a detection circle center O.

Figure 5A:
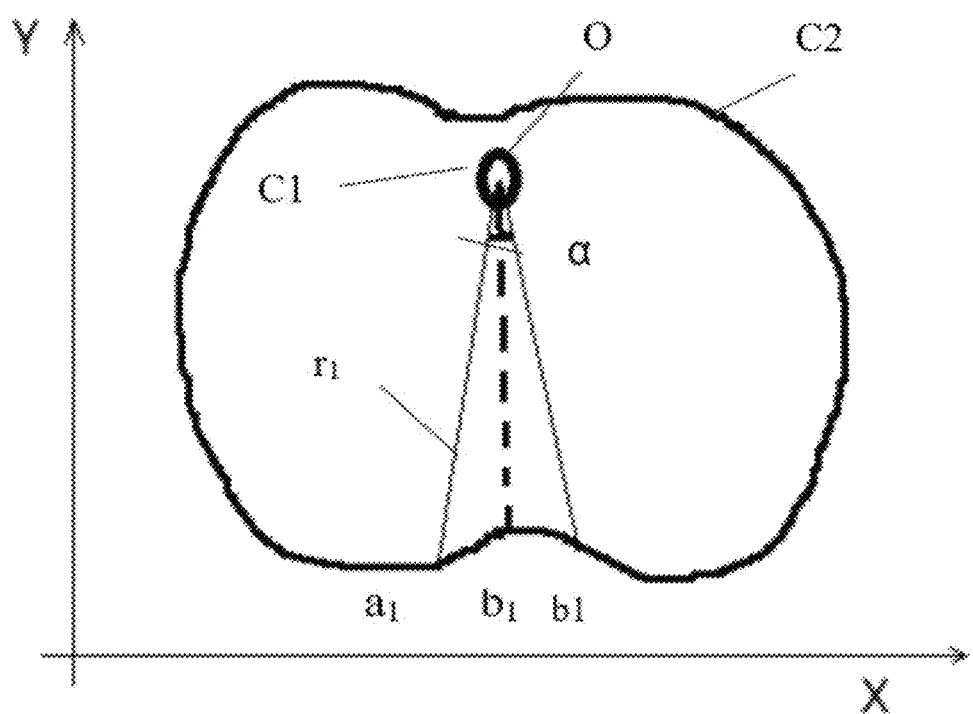
FIGS. 5A, 5B, 5C and 5D are schematic diagrams illustrating a principle of a method for determining a cutting parameter according to an embodiment of the present invention.

In step S102, a first cutting radius R1 is determined. A method for determining the first cutting radius R1 may be, for example, as follows: A detection range is set, with a detection circle center O as a circle center and a preset detection range angle α as a detection angle (the detection angle α may be a value within a reasonable range preset according to experience, and for example, may be selected within the range of 30-200°). As shown in FIG. 5A, within the detection angle range a, a distance from the detection center O to the target tissue contour C2 varies (area of Oa1-Ob1 in the figure), with a minimum distance as a detection radius r1. A safety factor may be preset, and the safety factor varies with different target tissues, and can be determined by experiments or obtained by a machine learning technology, etc. The product of the minimum distance r1 and the safety factor is taken as the cutting radius R1. It should be understood that the safety factor is set mainly to further improve the safety of cutting surgery, but is not necessary.

Figure 5B:
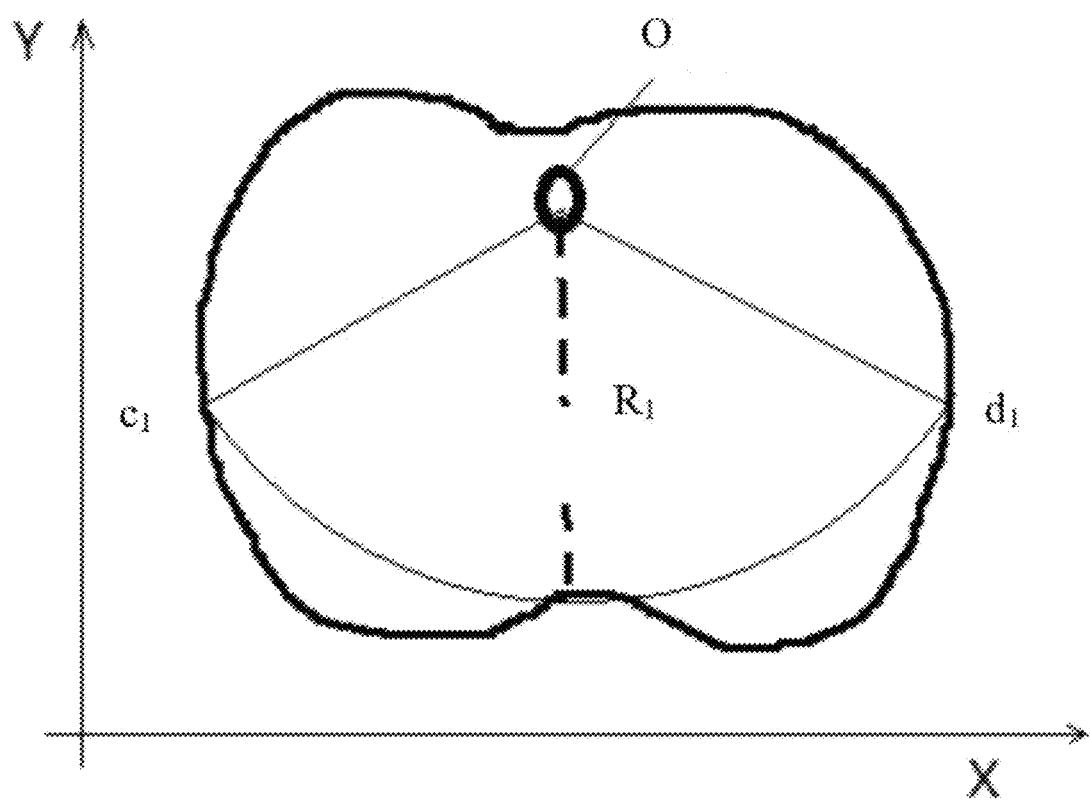
Figure 5C:
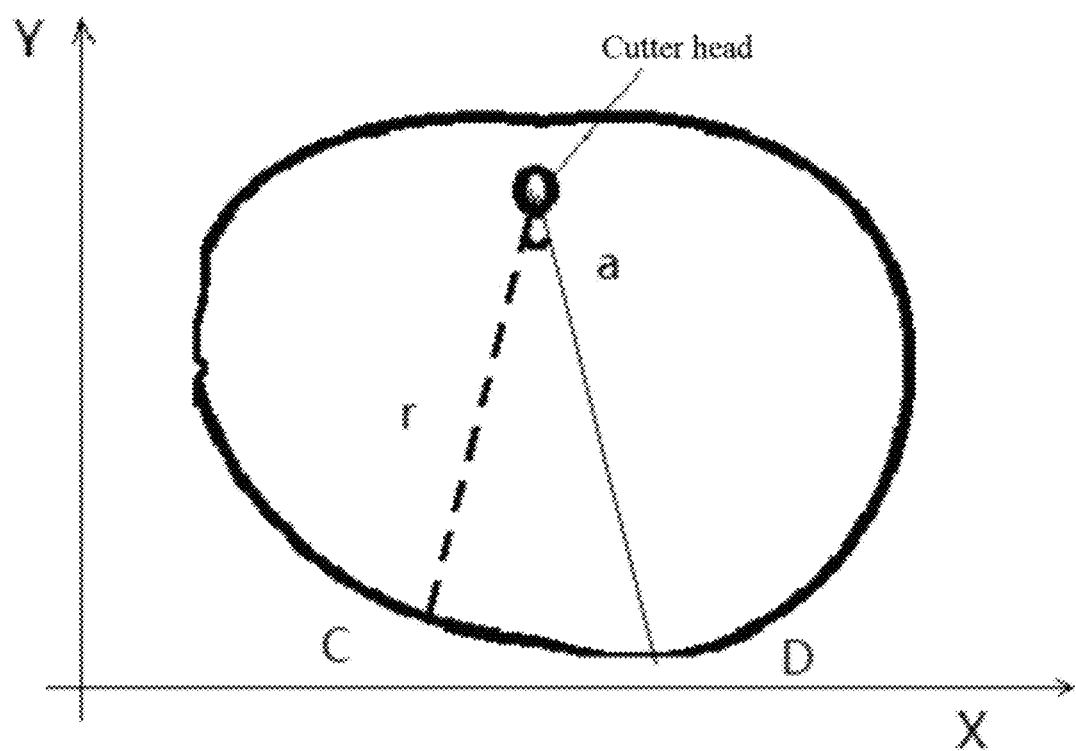
Figure 5D:
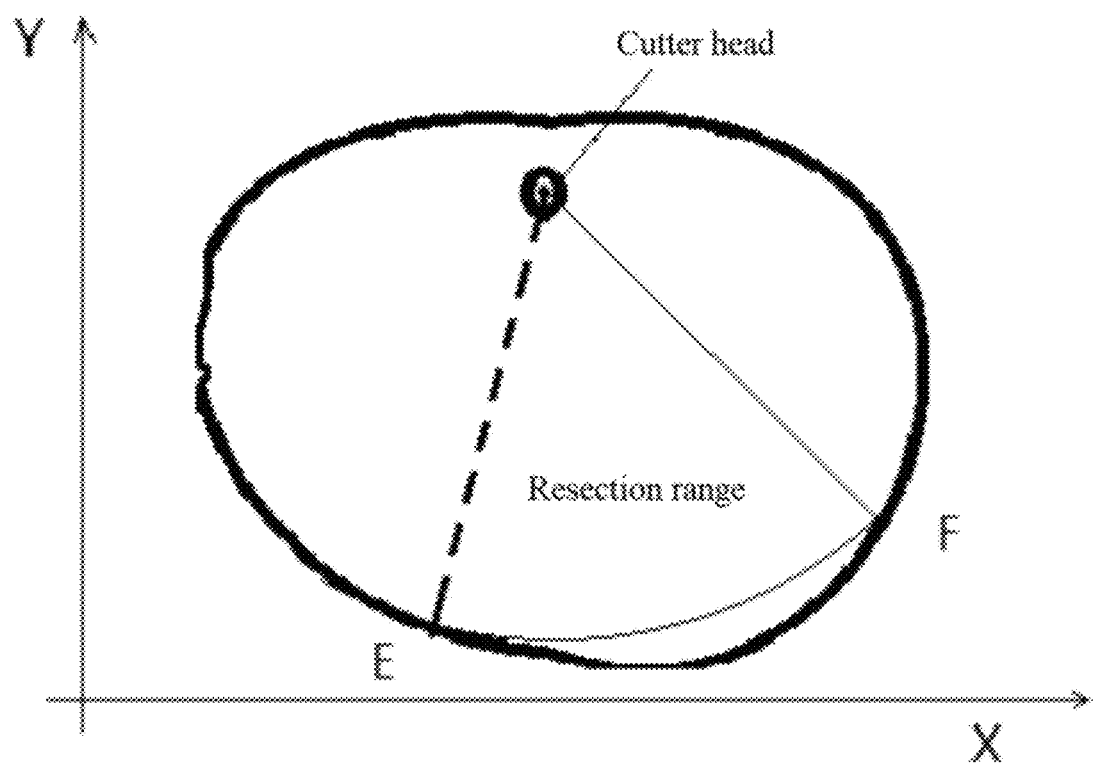

In step S103, a first sector is fitted with the circle center O and the cutting radius R1 to obtain intersection points c1 and d1 between the cutting radius R1 and the prostate contour C2, and a resection area S1 of the first sector is calculated, and is an area of a cutting sector Oc1d1 (see FIG. 5B).

In step S104, as shown in FIGS. 5-3 and 5-4, in a manner similar to S102, a second cutting radius R2 is determined to fit a second sector, and a resection area S2 of the second sector is calculated.

In step S105, a plurality of different cutting radius values R3, ..., Rn are determined to fit a plurality of sectors, intersection points of the plurality of fitted sectors and the tissue contour C2 are calculated, and cutting areas S3, ..., Sn are calculated.

In step S106, in S1, ..., Sn, a maximum resection area Smax is selected, and a cutting angle parameter βmax and a cutting depth parameter Rmax are determined based on a sector corresponding to the maximum resection area.

It may be understood that the cutting radii R1-Rn may be determined by setting the positions and ranges of different detection angles α and screening a minimum distance, or by other methods, such as decreasing the value based on R1, or by combining various methods.

It may be understood that in step S105, a sample value n of the collected cutting radius may be set based on an empirical value and preferably, may alternatively be determined according to a calculation speed, and preferably, a determining condition for stopping calculation may be whether a ratio of the resection area Sn to a total area S of the target tissue reaches a threshold, that is, if Sn/S is greater than the threshold, the cutting angle parameter βn and the cutting depth parameter Rn are determined by the fitted sector corresponding to Sn.

Figure 6A:
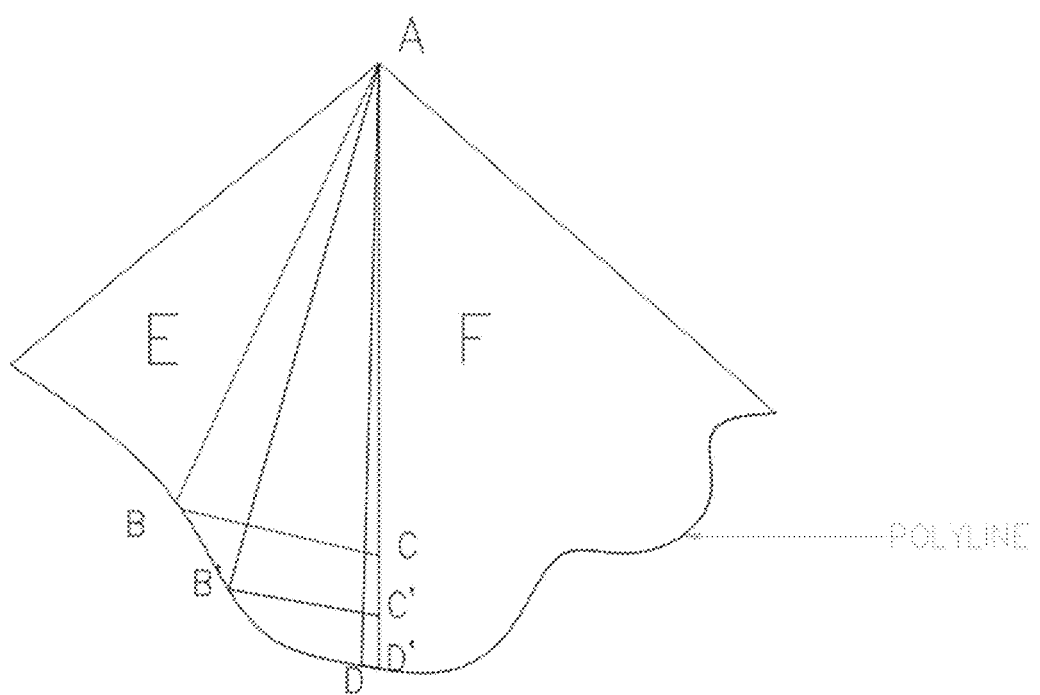
FIGS. 6A and 6B are schematic diagrams illustrating a principle of a method for determining a cutting parameter according to another embodiment of the present invention.
Figure 6B:
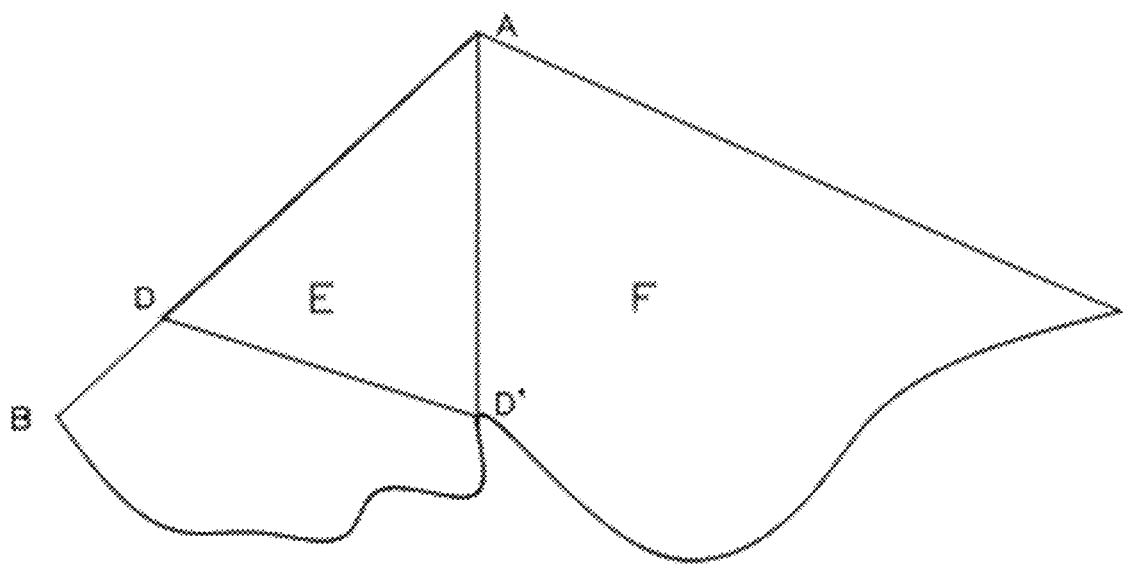
Figure 9:
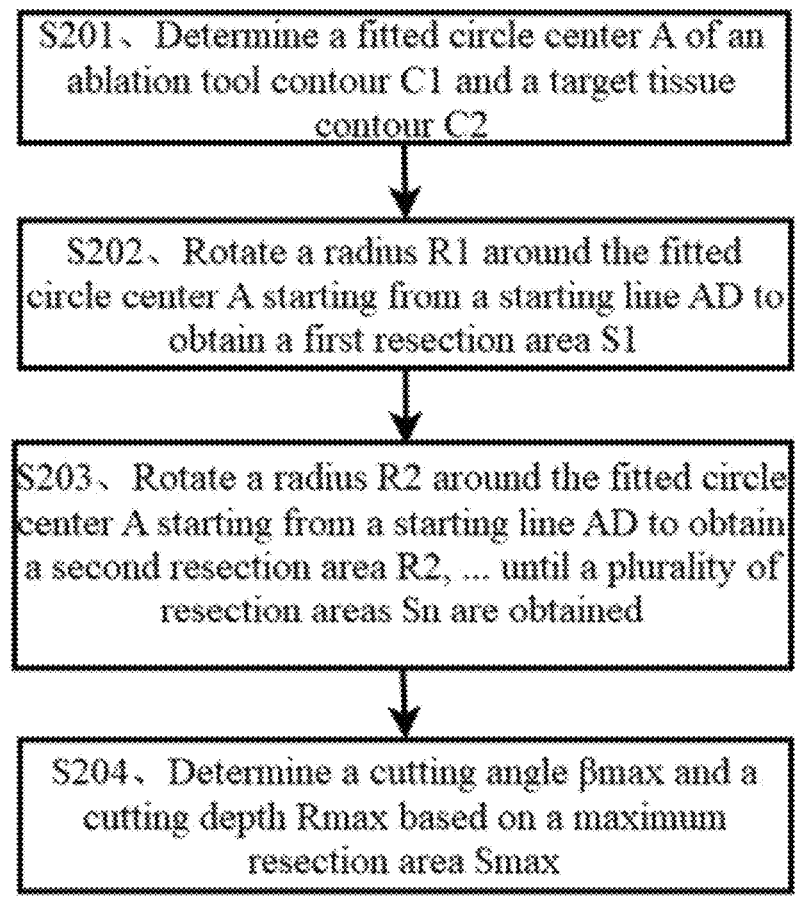
FIG. 9 is a flowchart of a method for determining a cutting parameter according to another embodiment of the present invention.

As shown in FIGS. 6-1 to 6-2, a principle of determining a cutting parameter by a rotation radius method is described, and main steps of this method are shown in FIG. 9.

In FIG. 6A, a point A is a fitted circle center O determined based on an ablation tool contour C1, and POLYLINE is a contour C2 of a target tissue. Starting from the point A, an area dividing line AD is introduced to the contour C2, to divide the target tissue image into two parts, E and F. An intersection point of the dividing line AD and the tissue contour C2 is D, and the length of a line segment AD is the first rotation radius R1.

In step S201, a fitted circle center of the ablation tool contour C1 and the target tissue contour C2 are determined.

In step S202, with the fitted circle center of the ablation tool and the first rotation radius R1 as a rotation radius, starting from a starting line AD with a direction preferably being a vertical direction, the rotation radius rotates leftward and rightward to determine two intersection points of the first rotation radius R1 and POLYLINE, and based on the positions of the two intersection points a1 and b1, a resection area covered by Aa1b1 is calculated as the first resection area S1.

In step S203, the rotation radius is adjusted to a second rotation radius R2, a third rotation radius R3, ..., and an nth rotation radius Rn according to a negative direction of a fixed step size, and a second resection area S2, a third resection area S3, ..., and an nth resection area Sn are determined by respectively rotating each rotation radius.

In step S204, rotation radius detection is stopped, in S1, ..., Sn, a maximum resection area Smax is selected, and a cutting angle parameter βmax and a cutting depth parameter Rmax are determined based on a sector corresponding to the maximum resection area.

Figure 7:
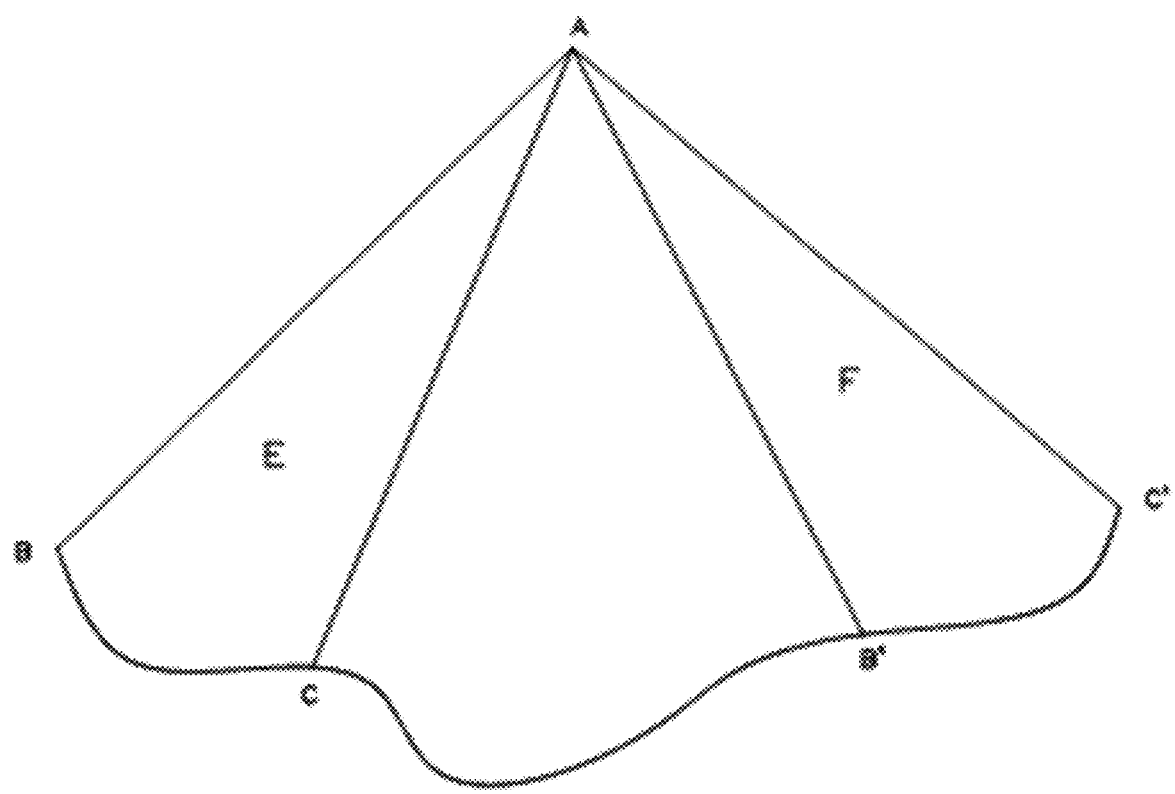
FIG. 7 is a schematic diagram illustrating a principle of a method for determining a cutting parameter according to another embodiment of the present invention.

FIG. 7 illustrates a principle of another embodiment of the extended application of the rotation radius method. According to this preferred solution, the starting line AD may be provided in a non-vertical direction, or a plurality of starting lines AD may be provided. For example, the starting line is in a direction having an included angle of 30-60° with a vertical line. As shown in FIG. 7, AC is a first starting line, and AB' is a second starting line. According to the steps similar to those shown in FIGS. 6 and 9, radius rotation is performed, a resection area is calculated, and a cutting angle parameter and a cutting depth parameter are determined based on the maximum or optimal resection area. It may be understood that the determined cutting angle parameter and cutting depth parameter may be numerical combinations. The embodiment of FIG. 7 is especially suitable for the case where parameters need to be set respectively for multiple cutter heads, and can also be suitable for the case where sensitive areas or other specific areas need to be avoided.

According to another embodiment of the present invention, a method for determining a cutting parameter that may also be adopted comprises obtaining a fitted circle center of an ablation tool contour, traversing intersection points of the circle center and the target tissue contour within a preset angle ($\beta$) range to obtain all radius values, and determining the cutting depth parameter R and the cutting angle parameter $\beta$ based on a minimum radius value. The preset angle range may be selected, for example, from 1500 to 240°, preferably 220°.

In addition, it is also possible to, after the minimum radius value is determined by the aforementioned traversal method, sequentially calculate a resection area for each radius value by decreasing the minimum radius value at specified intervals, and select the maximum resection area.

In addition, for each of the plurality of two-dimensional slice images, a plurality of groups of candidate resection areas may be calculated by changing a cutting depth and/or a cutting angle, a maximum area in the plurality of groups of candidate resection areas is selected as an optimal resection area, and a cutting depth and a cutting angle corresponding to the maximum resection area are taken as the cutting depth parameter (R) and the cutting angle parameter ($\beta$).

This is because, for tissues with irregular contours such as prostate, the maximum resection area in the current section may not be obtained only by selecting the maximum radius. By changing the cutting radius (cutting depth) and the cutting angle (including an orientation, a working angle, etc. of a cutting tool, etc.), a plurality of groups of candidate resection areas are obtained, which can improve the possibility of obtaining the best cutting area.

In addition, it is possible that for adjacent two-dimensional slice images in the plurality of two-dimensional slice images, the cutting depth parameter (R) and the cutting angle parameter ($\beta$) of each of the adjacent two-dimensional slice images are determined in such a manner that a ratio of an overlapping area of projections of respective resection areas of the adjacent two-dimensional slice images in an axial direction of the ultrasonic probe to each of the respective resection areas is a specified threshold or above.

This is because the prostate and other tissues are not columnar with a uniform section, and the cross-sectional contours of different positions may be different. By making the resection areas have an overlapping area between adjacent two-dimensional slice images with a ratio equal to or greater than a specified threshold, the resection area can be continuous in the axial direction (advancing/retreating direction of the cutting tool) of the target tissue, and excessive jump in the cutting area can be avoided.

As a preferred solution of the above embodiment, different preset angle ranges may be set in different directions. For example, with a vertical downward direction from the energy exit port taken as a dividing line, ranges of preset angles $\beta1$ and $\beta2$ are provided in a left area and a right area respectively. Within the ranges of the preset angles $\beta1$ and $\beta2$ on two sides, all radius values are obtained by traversing intersection points of the circle center and the contour of the target tissue, and the cutting depth parameter R1 within the range of the preset angle $\beta1$ and the cutting depth parameter R2 within the range of the preset angle $\beta2$ are determined based on the minimum radius value.

In some embodiments, a plurality of ablation tools are provided, and the above method can also be used to determine information of cutting sectors on the two-dimensional slice image. However, the processor needs to increase the method step of controlling the cutting ranges of the plurality of ablation tools not to coincide, and screen a cutting position with the largest sum of the cutting ranges of the plurality of ablation tools, so as to determine the position, angle and radius information of the cutting sectors of each ablation tool.

In some embodiments, the target tissue contour may be further divided for parameter determining and planning. For example, the contour may be divided into two areas, and the position, angle and radius information of the cutting sector in each area may be determined. The adopted method may be implemented by any method in the present invention.

Those skilled in the art can choose any one of the above-mentioned or similar cutting sector determining methods according to the shape of the contour of the target tissue, so as to be suitable for various target tissues with different shapes and structures.

The present invention further provides a computer-readable storage medium storing a computer program thereon, the program, when executed by a processor, implementing the method according to any one of the embodiments of the present invention.

Further, the present invention further provides an electronic device, including a memory, a processor, and a computer program that is stored in the memory and can be run in the processor, wherein the processor implements the method according to any one of the embodiments of the present invention when executing the computer program.

It should be noted that the sequence of above steps is only an illustration for the purpose of clearly illustrating this embodiment and does not constitute a limitation on the sequence of processing steps. In fact, the above steps can be completed in different orders, and those skilled in the art can make adjustments as needed. Some of steps may be added and/or deleted, and some steps may further include several sub-steps, and more conventional processing steps will not be repeated herein. If it is favorable to process, some of the above steps can also be repeated.

Those skilled in the art should understand that the embodiments of the present invention may be provided as a method, a system, or a computer program product. Therefore, the present invention may use a form of hardware-only embodiments, software-only embodiments, or embodiments combining software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to flowcharts and/or block diagrams of the method, the device (system), and the computer program product according to the embodiments of the present invention. It is to be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to operate in a specific manner, so that the instructions stored in the computer-readable memory generate an artifact that includes an instruction apparatus. The instruction apparatus implements a specific function in one or more procedures in the flowcharts and/or in one or more blocks in the block diagrams.

An internal memory may include a form of a volatile memory, a random access memory (RAM) and/or a non-volatile memory in the computer-readable medium, such as a read-only memory (ROM) or a flash memory (flash RAM). The internal memory is an example of the computer-readable medium.

It should also be noted that, the terms "comprise", "contain" or any other variation thereof, are intended to cover a non-exclusive inclusion, such that a process, method, commodity or device that includes a series of elements does not include only those elements but include other elements not expressly listed or include elements inherent to such a process, method, commodity, or device.

Without more limitation, the elements limited by the statement "including one . . . " do not exclude the presence of other identical elements in the process, method, commodity, or device that includes the elements. The terms cited in the present invention, such as "front", "back", "forward", "backward", and the like, are only for the sake of clarity and are not intended to limit the scope of implementation of the present invention, and any changes or adjustments in their relative relationships, without substantial changes in technical content, shall also be considered as falling within the scope of implementation of the present invention.

The above embodiments of the present invention have been described in detail, but the described content is only the preferred embodiments of the present invention and cannot be considered for limiting the range of implementation in the present invention. Any equal changes and improvements, etc. made within the invention scope of the present invention shall still fall within the patent coverage of the present invention.

What is claimed is:

1. A method for determining a cutting parameter of a benign prostatic hyperplasia tissue resection system, the system comprising an elongated ultrasonic probe configured for rectal insertion and a fluid ablation tool, and the method comprising the following steps:

acquiring ultrasonic image information of a target tissue from the ultrasonic probe, wherein the ultrasonic probe is the elongated ultrasonic probe;

obtaining a plurality of two-dimensional slice images from the ultrasonic image information according to a preset step size, wherein each of the plurality of two-dimensional slice images is a cross-sectional image perpendicular to an axial direction of the ultrasonic probe;

determining target tissue contour information and fluid ablation tool contour information in each of the plurality of two-dimensional slice images; and determining a set of cutting parameters of each two-dimensional slice image on the basis of the determined target tissue contour information and ablation tool contour information, the set of cutting parameters comprising a cutting position parameter, a cutting depth parameter, and a cutting angle parameter, wherein the cutting position parameter corresponds to an axial position along the ultrasonic probe, the cutting depth parameter corresponds to a radial distance from the fluid ablation tool, and the cutting angle parameter corresponds to an angular span of a resection sector, performing the cutting according to the set of cutting parameters.

2. The method for determining a cutting parameter of a benign prostatic hyperplasia tissue resection system according to claim 1, wherein the step of determining the set of cutting parameters of each two-dimensional slice image further comprises: acquiring a fitted circle center of the fluid ablation tool contour as a detected circle center; and determining, with the detected circle center as a circle center, the cutting depth parameter and the cutting angle parameter by means of a sector fitting method or a rotation radius method, so as to obtain an optimal resection area within a safety range.

3. The method for determining a cutting parameter of a benign prostatic hyperplasia tissue resection system according to claim 1, wherein the step of determining the set of cutting parameters of each two-dimensional slice image further comprises: acquiring a fitted circle center of the fluid ablation tool contour, determining the cutting depth parameter based on a minimum value of a distance between the circle center and each intersection point on a target tissue contour within a preset angle range, and determining the cutting angle parameter based on an intersection point of an arc with the fitted circle center of the fluid ablation tool contour as a circle center and the cutting depth parameter as a radius.

4. The method for determining a cutting parameter of a benign prostatic hyperplasia tissue resection system according to claim 1, wherein the step of determining the set of cutting parameters of each two-dimensional slice image further comprises: for each of the plurality of two-dimensional slice images, a plurality of groups of candidate resection areas are calculated by changing a cutting depth and/or a cutting angle, a maximum area in the plurality of groups of candidate resection areas is selected as an optimal resection area, and a cutting depth and a cutting angle corresponding to the optimal resection area are taken as the cutting depth parameter and the cutting angle parameter.

5. The method for determining a cutting parameter of a benign prostatic hyperplasia tissue resection system according to claim 1, wherein the step of determining a cutting parameter of each two-dimensional slice image further comprises: for adjacent two-dimensional slice images in the plurality of two-dimensional slice images, the cutting depth parameter and the cutting angle parameter of each of the adjacent two-dimensional slice images are determined in such a manner that a ratio of an overlapping area of projections of respective resection areas of the adjacent two-dimensional slice images in an axial direction of the ultrasonic probe to each of the respective resection areas is a specified threshold or above.

6. The method for determining a cutting parameter of a benign prostatic hyperplasia tissue resection system according to claim 1, wherein the step of determining the set of cutting parameters of each two-dimensional slice image further comprises: determining the set of cutting parameters on the basis of a setting safety factor.

7. A non-transitory computer-readable storage medium storing a computer program thereon, wherein the program implements the method according to claim 1 when executed by a processor.

* * * * *